United States Patent
Soto Ridd et al.

(10) Patent No.: US 11,917,035 B1
(45) Date of Patent: Feb. 27, 2024

(54) EGRESS RATE CONTROL IN AN EVENT BUS SERVICE

(71) Applicant: Amazon Technologies, Inc., Seattle, WA (US)

(72) Inventors: Gustavo Soto Ridd, Vancouver (CA); Shawn Patrick Jones, Calgary (CA); Rishi Baldawa, Vancouver (CA); Nikita Pinski, Vancouver (CA); Asim Himani, Vancouver (CA); Igor Subbotin, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/066,580

(22) Filed: Dec. 15, 2022

(51) Int. Cl.
  *H04L 67/61* (2022.01)
  *H04L 67/63* (2022.01)
(52) U.S. Cl.
  CPC .............. *H04L 67/63* (2022.05); *H04L 67/61* (2022.05)
(58) Field of Classification Search
  None
  See application file for complete search history.

(56) References Cited

U.S. PATENT DOCUMENTS

| 11,422,871 | B1* | 8/2022 | Mounirou | G06F 16/113 |
| 2017/0228253 | A1* | 8/2017 | Layman | G06F 11/3013 |
| 2021/0044549 | A1* | 2/2021 | Renjith | H04L 67/125 |

* cited by examiner

*Primary Examiner* — Jeffrey R Swearingen
(74) *Attorney, Agent, or Firm* — Nicholson De Vos Webster & Elliott LLP

(57) ABSTRACT

Techniques are described for enabling a cloud-based service to provide rate controls for events to be delivered by the service to event targets. An event bus service, for example, broadly enables users to create and configure event buses that receive events from event sources and from which the event bus service filters, transforms, routes, and delivers events to selected event targets according to configurable rules. A new event egress call pattern is provided that estimates a rate of attempted event traffic to event targets and a rate of successfully delivered event traffic (also referred to as a local rate estimation), and that uses the rate estimations to determine when it may be appropriate to throttle event delivery, thereby reducing stress on downstream systems experiencing capacity issues and potentially reducing a number of event delivery retries to be handled by the event bus service.

20 Claims, 8 Drawing Sheets

EGRESS RATE CONTROL IN AN EVENT BUS SERVICE

BACKGROUND

Some cloud service providers include event bus services that enable users to route events (e.g., representing changes in various types of computing environments) to event targets (e.g., other cloud services, application programming interface (API) endpoints, etc.). These services enable users to build event-driven applications at scale across cloud services, existing systems, external software as a service (SaaS) applications, and the like, and further enable users to more easily monitor and audit their computing resources, among other use cases.

BRIEF DESCRIPTION OF DRAWINGS

Various examples in accordance with the present disclosure will be described with reference to the drawings, in which.

DETAILED DESCRIPTION

Figure 1:
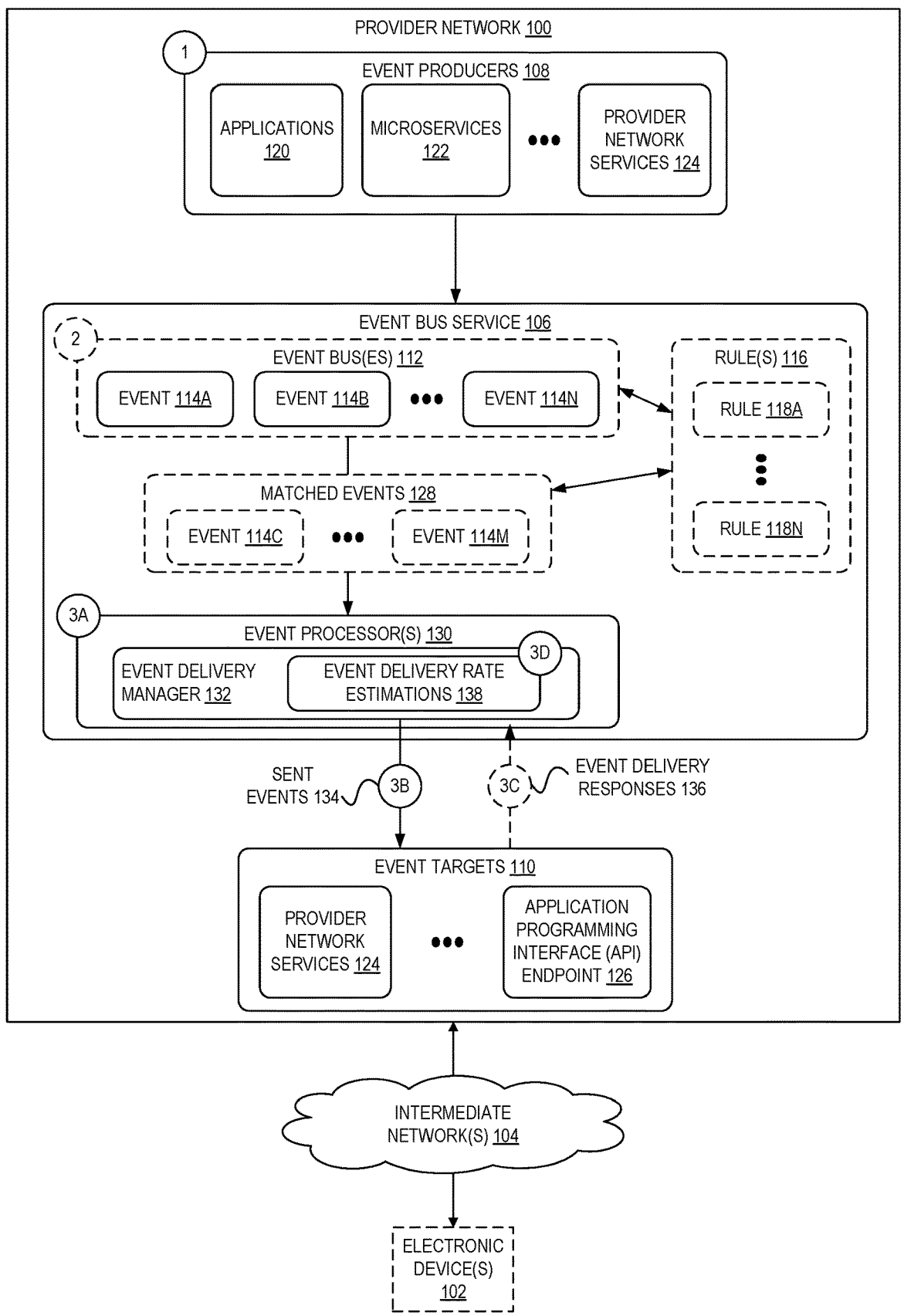
FIG. 1 is a diagram illustrating an environment including an event bus service of a cloud provider network that provides dynamic throttling functionality for sending events to event targets based at least in part on measuring event delivery performance according to some examples.

The present disclosure relates to methods, apparatus, systems, and non-transitory computer-readable storage media for enabling an event bus service to provide rate controls for events to be delivered by the service to event targets (e.g., to throttle events sent to downstream services or other targets experiencing capacity issues). An event bus service broadly enables users to create and configure event buses that receive events from event sources (e.g., from user applications, cloud services, software as a service (SaaS) applications, etc.) and from which the event bus service filters, transforms, routes, and delivers events to selected event targets according to configurable rules. According to examples described herein, a new event egress call pattern is provided that estimates a rate of attempted event traffic to event targets and a rate of successfully delivered event traffic (also referred to as local rate estimations), and that uses the rate estimations to determine when it may be appropriate to throttle event delivery, thereby reducing stress on downstream systems experiencing capacity issues and potentially reducing a number of event delivery retries to be handled by the event bus service.

As indicated, an event bus service generally provides resources for ingesting, filtering, transforming, and delivering events from connected applications and services to event targets based on configurable rules. Based on the specific rules configured by a user and an amount of event traffic sent to the event bus service, there exist various scenarios where an event bus service may send high volumes of event traffic to downstream event targets and can cause those targets to brownout or fail entirely if the targets cannot accommodate the traffic. For example, it is possible in some cases for users to misconfigure event matching rules leading to event loop scenarios (e.g., where a same event matches one or more rules, the event bus service sends the event downstream, and the event is added back on to the bus and matched again). In other cases, sudden bursts of traffic from event sources and/or under-provisioned event targets can cause event targets to be unable to handle an amount of event traffic delivered by an event bus service. Typically, an event bus service attempts to send as much event traffic as possible up to some universal maximum rate even in these and other scenarios. As indicated, however, this can lead to situations that overwhelm event targets that are unable to handle traffic at higher event delivery rates.

To address these challenges, among others, the event bus service provides egress event delivery rate controls that are responsive to information received from downstream targets to which events are sent and/or other event delivery performance information obtained by the event bus service. As described in more detail herein, an event bus service includes event delivery managers that maintain rate estimations for an amount of event traffic sent to particular event targets and rate estimations for an amount of traffic that is successfully delivered (e.g., does not result in a throttling exception, timeout, or other error indication from the event target). Using these rate estimations, the event bus service can dynamically determine when to throttle traffic to certain event targets (e.g., when the amount of successfully delivered traffic relative to the rate of total traffic sent falls below some threshold) and when to resume sending traffic at a higher rate once a throttled target has recovered. Among other benefits, the described egress event delivery rate controls enable an event bus service to efficiently send event traffic while avoiding overloading event targets where possible, thereby improving the overall event delivery experience for users.

FIG. 1 is a diagram illustrating an environment including an event bus service of a cloud provider network that provides dynamic throttling functionality for sending events to event targets based at least in part on measuring event delivery performance according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can use electronic device(s) 102 to interact with a provider network 100 across one or more intermediate networks 104 (e.g., the internet) via one or more interfaces, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interfaces can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The event bus service 106 is a service that provides real-time access to changes in data in cloud provider network services, users' own applications, software as a service (SaaS) applications, etc., without the need for users to write code to process and route the events. To use the event bus service 106, users can use a web-based console or other interface of the service 106 to create an event bus, optionally identify one or more event producers 108 the user desires to send events to the event bus, and create rules used to determine how events are routed to different event targets 110. Once configured, the event bus service 106 can automatically deliver events in real-time or near-real-time to configured targets.

As indicated, to use the event bus service 106, a user can initially configure an application, service, or other component to emit events to the event bus service 106 and the service automatically creates an event bus to which events will be routed (e.g., an event bus 112 showing example event 114A, event 114B, . . . , event 114N). In some examples, an event sent to the event bus service 106 conforms to a defined format or structure (e.g., a JSON-based structure). An event can include a set of standard top-level envelope event fields such as, for example, a source of the event, a timestamp, a region, and so forth. An event can further include a "detail" event field including the body of the event. For example, a managed compute service of the provider network 100 might be configured to emit events when new instances are launched in association with a user account, where each event can indicate that its source is the managed compute service, and the event detail can include text indicating that "A new compute instance was created successfully." In general, the data included in the event detail field can include any information of interest to the event producer, an event target, or both.

The event bus service 106 enables users to filter events sent to an event bus with rules (e.g., rules 116, including a rule 118A, . . . , rule 118N). A rule 116, in some examples, matches incoming events for a given event bus and routes events matching the rule to one or more specified targets for processing. As indicated, a single rule can route to multiple targets, where each of the targets can process the event in parallel. A set of rules, for example, can enable different application components to process events that are relevant to each particular application component or to generally enable events conform to any other desired event delivery configurations. A rule can optionally further customize an event before the event is sent to one or more targets, e.g., by passing only certain parts of an event, modifying parts of an event, supplementing an event with additional data, and the like.

As described, the event bus service 106 described herein includes functionality used to throttle event delivery to certain event targets 110 responsive to measuring event delivery performance according to examples. Although some of the examples described herein are provided in the context of an event bus service 106, the ability to throttle event delivery can be used by other types of services within a provider network 100. For example, a provider network 100 can include a notification service that enables applications to publish messages (which can also be referred to as events or notifications) that are delivered to subscribers or other applications (e.g., in a public-subscribe, or pub-sub, arrangement). A notification service can similarly use the techniques described herein to throttle the delivery by a notification service of events or notifications to any targets of those events or notifications. As another example, a provider network 100 can include a service that creates serverless GraphQL and pub-sub APIs enabling access to data from one or more sources or microservices with a single network request. In this example, the service can dynamically throttle invocations of downstream endpoints using the techniques described herein. In general, the techniques described herein for throttling the sending of events can be applied to any service that sends events, messages, payloads, requests, notifications, invokes endpoints, or otherwise interacts with one or more downstream services, applications, or computing resources.

The circles labeled "1", "2," and "3A"-"3D" in FIG. 1 illustrate an example process in which the even bus service 106 dynamically performs event throttling in situations where one or more downstream event targets 110 are experiencing operational or other performance issues due to event traffic. At circle "1," for example, event producers 108 (e.g., any of applications 120, microservices 122, . . . , provider network services 124) generate events sent to the event bus service 106. As indicated, an event broadly represents a message obtained from an event producer indicating, e.g., a change in an environment or other information associated with, e.g., an application, a service of the provider network 100, or a service or application external to the provider network 100. The even can include information identifying, e.g., an event identifier, a timestamp, a source of the event, and additional detail information.

At circle "2," the event bus service 106 stores the events in one or more event busses (e.g., an event bus 112). For example, a user of the event bus service 106 can configure one or more event bus(es) 112 to store events from certain event producers and, once the event bus service 106 receives events from an event producer 108, the event bus service 106 stores the event in the bus (e.g., such as events 114A, event 114B, . . . event 114N) until each event matches one or more of event rule(s) 116 or some other condition occurs. In the example of other types of services that can use the dynamic rate throttling techniques described herein, a rule may not be used and instead events may be delivered automatically, based on pub-sub configurations, or in any other manner. The matched events 128 (e.g., such as event 114C, . . . , event 114M), for example, represent events that matched one or more of rule(s) 116 and are now to be sent to one or more event target(s) 110 specified by any matching rules for those events. In some examples, matched events 128 can be stored in a separate queue or other data structure from which one or more event processor(s) 130 obtain the events, optionally perform additional event processing, and prepare the events for delivery to the specified targets. As shown in subsequent figures, the matched events 128 can optionally include additional data added to the matched events by the event bus service 106 (e.g., enrichment information) related to the event, related to the event target, or other relevant metadata information.

As indicated, at circle "3A," an event processor 130 determines, according to one or more rule(s) 116, to deliver events to one or more event targets 110. In some examples, an event processor 130 is a microservice or other type of software application that handles the delivery of messages to event targets. For example, the event processor(s) 130 can in some implementations be implemented using a fleet of compute instances responsible for obtaining matched events 128 and sending the events to their appropriate destinations (e.g., by making an API call, sending the event to another bus or queue, etc.). The event processor(s) 130 generally attempts to send messages to downstream services at quickly as possible, up to possibly one or more universal traffic rate thresholds defined by the event bus service 106.

At circle "3B," for example, an event delivery manager 132 of the event processor(s) 130 has attempted to deliver some number of events to one or more event targets 110 (illustrated as sent events 134). The event targets receive and process those events according to whatever processes have been configured at those targets. In some examples, an event target can optionally send an event delivery response (e.g., one of event delivery responses 136) indicating that one or more events were delivered successfully to the target. In some cases, however, due to excessive event traffic being sent from the event bus service 106 or due to other conditions (e.g., network outages or congestion, security events, etc.), an event target might be unable to successfully receive some or all events sent from the event bus service 106 over some period. In those scenarios, an event target 110 can optionally send, at circle "3C," an event delivery response 136 indicating that the event target is experiencing operational issues (e.g., a throttling exception message or other type of error message), if possible. In other cases, a timeout message might be sent back to the event bus service, or the events might be dropped silently. In some examples, the event processor(s) monitor whether events were successfully delivered to event targets 110 to obtain event delivery data (e.g., data stored in memory, a cache, or other data structure indicating whether events were delivered successfully). For example, the event processor(s) 130 can determine whether a success message is received from an event target, or whether a throttling exception, timeout message, or other indication that an event might not have been successfully delivered is received.

In some examples, responsive to the event traffic obtained and sent by event processor(s), 130 and further responsive to the data obtained about whether events were successfully delivered to the appropriate event targets 110, at circle "3D," the event processor(s) 130 continuously update event delivery rate estimations 138. The generation of event delivery rate estimations is described in more detail hereinafter; however, broadly the event delivery rate estimations provide an estimate of a rate at which events are being sent to particular event targets and a rate at which events are being successfully delivered to those event targets. In this manner, the event processor(s) 130 can generate estimations of whether individual event targets (e.g., downstream services of the provider network) are experiencing issues with a threshold amount of event traffic and can determine whether to throttle delivery of events to one or more event targets (e.g., when the rate of successfully delivered traffic falls below some percentage of the estimated rate of the total amount of traffic sent). These estimated rates can decrease and increase over time, such that an ongoing measure of the health of downstream event targets is maintained. For example, in general, the event processor(s) 130 can generate local rate estimates using an algorithm that smooths the data to some degree (e.g., uses "low pass filtering" to filter out some spikiness in the incoming and sent events), depends more on a number of events recently sent and delivered successfully and depends less on events the further in the past, etc.

Returning again to circle "3A," the event processor(s) 130 can then, based on the local estimated rates, dynamically throttle the delivery of event traffic to particular event targets 110 that may be experiencing issues handling the traffic at any given time. For example, if an event processor 130 determines that a downstream provider network service 124 is returning more than a threshold percentage of throttling exceptions responsive to event traffic sent to the service, the event processor 130 can decrease the rate at which new events are sent to the downstream service (e.g., down to one event per minute or at any other reduced rate). Once the impacted event target 110 scales up its resources to handle the demand, and/or the rate of incoming event traffic is sufficiently reduced, the event delivery rate estimations may at some point reflect that the service is again successfully receiving more than the threshold percentage of events, and the event processor 130 can again increase the rate at which events are delivered to the service.

Figure 2:
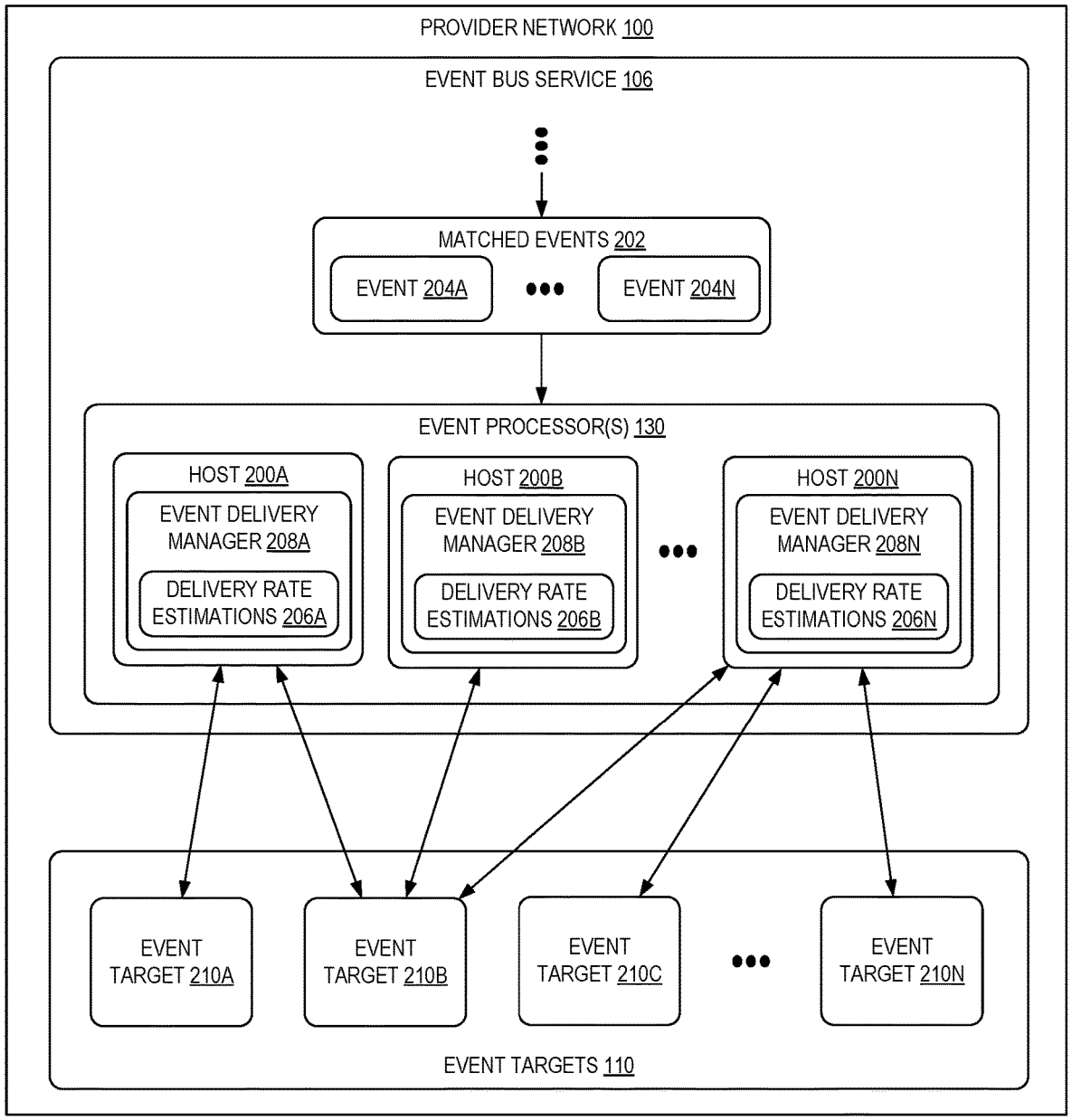
FIG. 2 is a diagram illustrating a fleet of computing resources used by an example event bus service to implement dynamic throttling functionality for events to be delivered to event targets according to some examples.

FIG. 2 is a diagram illustrating a fleet of computing resources used by an example event bus service 106 to implement dynamic throttling functionality for events to be delivered to event targets according to some examples. As shown, the event processor(s) 130 includes a fleet of computing resources (e.g., compute instances, containers, etc., including host 200A, host 200B, . . . , host 200N) each configured to obtain events to be sent to an event target (e.g., from matched events 202, including event 204A, . . . , event 204N), to attempt to send the obtained events, and to maintain local rate estimation data (e.g., delivery rate estimations 206A, delivery rate estimations 206B, . . . , delivery rate estimations 206N maintained respectively by an event delivery manager 208A, event delivery manager 208B, . . . , event delivery manager 208N) for events sent by each host. As shown, each host of the fleet of computing resources can send events to one or more different event targets (e.g., event target 210A, event target 210B, event target 210C, . . . , event target 210N) over time depending on the events obtained by each host.

In some examples, the delivery rate estimations generated by the event processor(s) 130 of an event bus service 106 can calculate the estimations relative to one or more data keys. One key, for example, can be the target service to which each event is sent. In this manner, each event processor can track whether a service or other target as a whole is capable of handling the event traffic being sent to it. In some examples, another key that can be associated with the delivery rate estimations is a user account identifier associated with the events processed by an event processor. Using a user account identifier, for example, can enable the event bus service 106 to throttle "noisy" accounts that may be causing capacity issues due to misconfigurations or misuse without negatively impacting a rate at which other user accounts can deliver events. The event bus service can, in some examples, deprioritize delivery of events associated with an account (e.g., assign events associated with a noisy user account to a lower priority event queue or otherwise ensure that the user's events are deprioritized for sending relative to other less noisy user accounts). In some examples, another possible data key is an individual computing resource to which events relate (e.g., identified by a unique resource identifier assigned to computing resources, such as databases, queues, compute instances, etc., by the services providing those resources).

Figure 3:
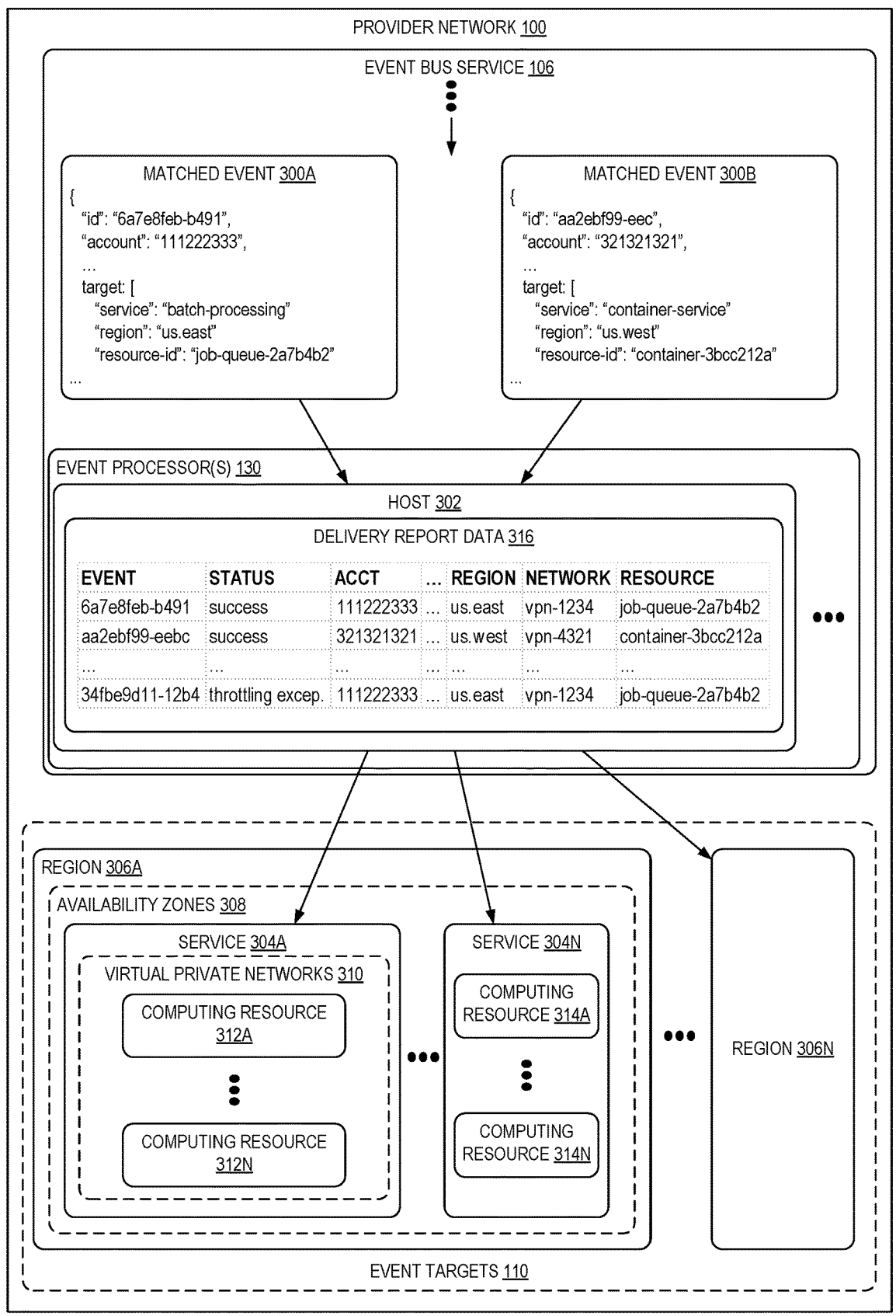
FIG. 3 is a diagram illustrating examples of different dimensions upon which an example event bus service can throttle the delivery of events to event targets according to some examples.

FIG. 3 is a diagram illustrating examples of different dimensions upon which an example event bus service can throttle the delivery of events to event targets according to some examples. As shown in FIG. 3, for example, each event (such as matched event 300A or matched event 300B) can include a plurality of fields identifying information such as, e.g., an identifier of the event, a type of the event, a source of the event, a user account associated with the event, a time the event occurred, a region of the cloud provider network, an event detail field including information about the event. A host 302 can send events to different types of event targets (e.g., a service 304A or service 304N) possibly in different regions (e.g., one of region 306A, . . . , region 306N), availability zones 308, and involving different computing resources in possibly different virtual private networks 310 (e.g., computing resource 312A, computing resource 312N, computing resource 314A, computing resource 314N).

The attributes of events sent by an event processor 130 can be used to create event delivery report data 316 indicating, for events associated with various different attributes, whether delivery of the events was successful. Using this information, event processor(s) 130 can calculate estimated rates of incoming events and estimated rates of successful delivery of events along many different types of dimensions. In this manner, the event processor(s) 130 can calculate estimated delivery rates for specific computing resources, for events sent to particular virtual private networks, availability zones, Internet Protocol (IP) ranges, etc., and throttle the delivery of events upon determining that events sent to particular types of targets are failing to be delivered at a rate that exceeds a defined threshold.

In some examples, a user of the event bus service 106 can specify one or more values included in events and for which the user desires for the event bus service 106 to throttle events upon detecting event delivery issues. For example, a user might include a same identifier in events generated by a user's application, where the events might be intended for delivery to two or more different event targets. If one or more of the event targets for those events is experiencing capacity issues, the user might desire for all events including the identifier to be throttled (e.g., such that the various services do not get significantly out of sync). In this example, the user can use a web-based console or other interface of the event bus service 106 to specify the identifier, and the event processor(s) 130 of the service can generate rate estimation data for events including the same identifier.

Figure 4:
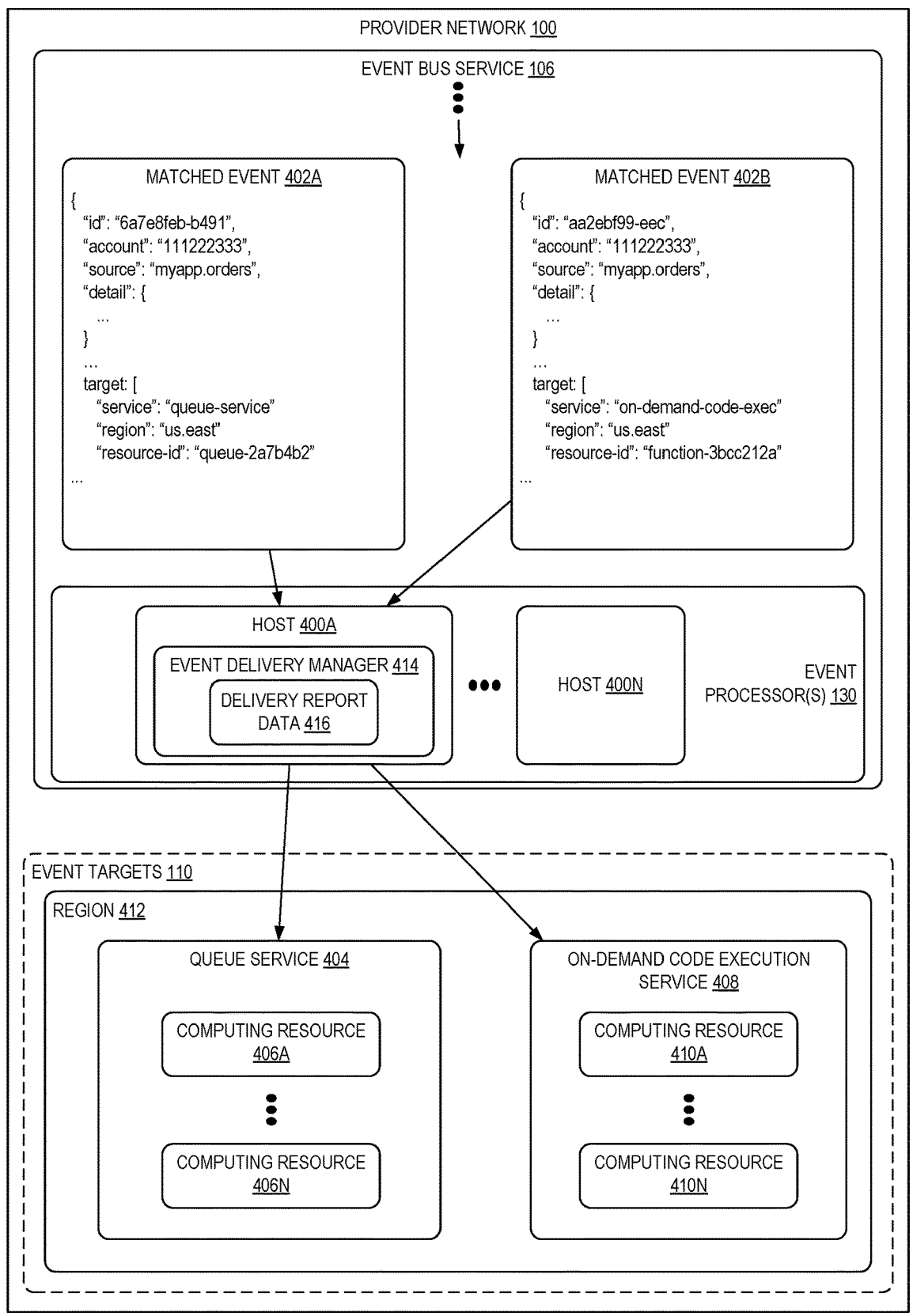
FIG. 4 is a diagram illustrating an example of an event bus service throttling the delivery of events across potentially multiple event targets based on data contained in events according to some examples.

FIG. 4 is a diagram illustrating an example of an event bus service throttling the delivery of events across potentially multiple event targets based on data contained in events according to some examples. For example, as shown in FIG. 4, a host 400A (of a fleet of hosts including host 400N) obtains at least two separate matched events including an event 402A and an event 402B. In this example, a user has specified a desire to dynamically throttle events including an identifier of a source application (e.g., "myapp.orders") regardless of the event target 110 to which the events are to be delivered. For example, the events associated with the "myapp.orders" application might be delivered to both a queue service 404 (providing computing resource 406A, . . . , computing resource 406N) and an on-demand code execution service 408 (providing computing resource 410A, . . . , computing resource 410N). The services can be located across one or more regions 412 of the provider network 100.

In this example, an event delivery manager 414 running on a host 400A can collect delivery report data 416 keyed in part on the source application identifier specified by the user. In this manner, if one or more of the downstream services to which events associated with the source application are sent experiences capacity issues, the event delivery manager 414 can dynamically throttle a rate at which events associated with the application are sent to any downstream service (e.g., so that the services do not become significantly out of sync). In other examples, users can specify one or more values associated with one or more fields of events to use as keys for throttling events.

Figure 5:
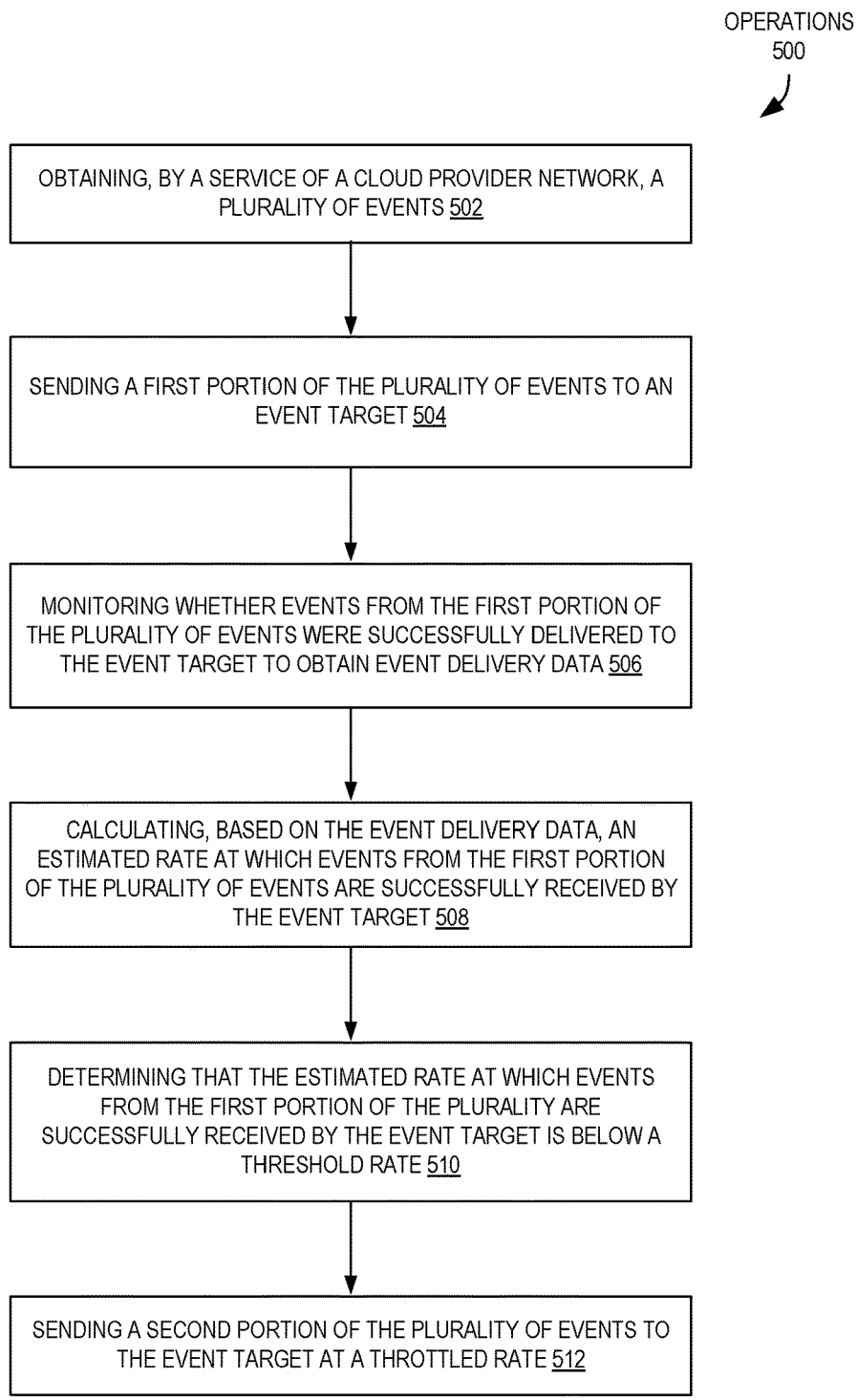
FIG. 5 is a flow diagram illustrating operations of a method for providing event throttling for events to be delivered by an event bus service in a cloud provider network to event targets according to some examples.

FIG. 5 is a flow diagram illustrating operations 500 of a method for providing event throttling for events to be delivered by an event bus service in a cloud provider network to event targets according to some examples. Some or all the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by an event bus service 106 of the other figures.

The operations 500 include, at block 502, obtaining, by a service of a cloud provider network, a plurality of events.

The operations 500 further include, at block 504, sending the first portion of the plurality of events to the event target.

The operations 500 further include, at block 506, monitoring whether events from the first portion of the plurality of events were successfully delivered to the event target to obtain event delivery data.

The operations 500 further include, at block 508, calculating, based on the event delivery data, an estimated rate at which events from the first portion of the plurality of events are successfully received by the event target.

The operations 500 further include, at block 510, determining that the estimated rate at which events from the first portion of the plurality are successfully received by the event target is below a threshold rate.

The operations 500 further include, at block 512, sending a second portion of the plurality of events to the event target at a throttled rate.

In some examples, the operations 500 further include calculating an updated estimated rate at which events from the second portion of the plurality of events are successfully received by the event target; determining that the updated estimated rate at which events from the second portion of the plurality of events are successfully received by the event target is at or above the threshold rate; and sending additional events to the event target at a non-throttled rate.

In some examples, the plurality of events is a first plurality of events, wherein the first plurality of events are associated with a first user account of the cloud provider network, and wherein the operations 500 further include: obtaining, by the service, a second plurality of events associated with a second user account of the cloud provider network; determining, during a time at which the service is sending events associated with the first user account at the throttled rate, to send an event associated with the second user account from the second plurality of events to the event target; and sending the event associated with the second user account to the event target at a non-throttled rate.

In some examples, the operations 500 further include determining that the plurality of events are associated with a user account of the cloud provider network; and deprioritizing delivery of events associated with the user account relative to other user accounts.

In some examples, the event target is a service of the cloud provider network, and the operations 500 further include determining, based on the estimated rate, to send events directed to the service of the cloud provider network at the throttled rate.

In some examples, the event target is a same computing resource provided by a service of the cloud provider network, and the operations 500 further include determining, based on the estimated rate, to send events directed to the same computing resource at the throttled rate.

In some examples, the plurality of events is a first plurality of events, wherein the event target is a first event target, wherein the event delivery data is first event delivery data, and the estimated rate is a first estimated rate, and wherein the operations 500 further include: determining that a first portion of a second plurality of events is to be sent to one or more second event targets; sending the first portion of the second plurality of events to the one or more second event targets, wherein the one or more second event targets are associated with a same attribute corresponding to at least one of: a virtual private network, an availability zone of the cloud provider network, a region of the cloud provider network, an organization of user accounts, a vendor, or an Internet Protocol (IP) range; calculating, based on the event delivery data, a second estimated rate for the one or more second event targets that are associated with the same attribute; determining that the second estimated rate is below a threshold rate; and sending a second portion of the second plurality of events to the one or more second event targets at a throttled rate.

In some examples, an event from the plurality of events includes a data object indicating a change associated with at least one of: an application, a service of the cloud provider network, or a service external to the cloud provider network; and wherein the data object includes a plurality of fields identifying at least one of: an identifier of the event, a type of the event, a source of the event, a user account associated with the event, a time the event occurred, a region of the cloud provider network, and an event detail field including information about the event.

In some examples, an event from the plurality of events includes an event detail field including information about the event, wherein the event detail field is generated by a source of the event, and wherein the estimated rate is generated for events from the first portion of the plurality of events including one or more defined values in the event detail field.

In some examples, the plurality of events is a first plurality of events, wherein the event target is a first event target, wherein an event from the first plurality of events includes an event field including information about the event, wherein the event field is generated by a source of the event, and wherein the estimated rate is generated for events from the first portion of the plurality of events including one or more user-specified values in the event field, and wherein the operations 500 further include: obtaining a second plurality of events; determining, based on one or more configured rules, that an event from the second plurality of events is to be sent to a second event target; identifying the one or more user-specified values in an event detail field of the event from the second plurality of events; and sending the event from the second plurality of events at the throttled rate.

In some examples, events from the plurality of events are sent by a computing resource of a fleet of computing resources responsible for sending events to event targets including the event target, and wherein computing resources of the fleet of computing resources each calculate a respective estimated rate at which events are successfully received by event targets.

Figure 6:
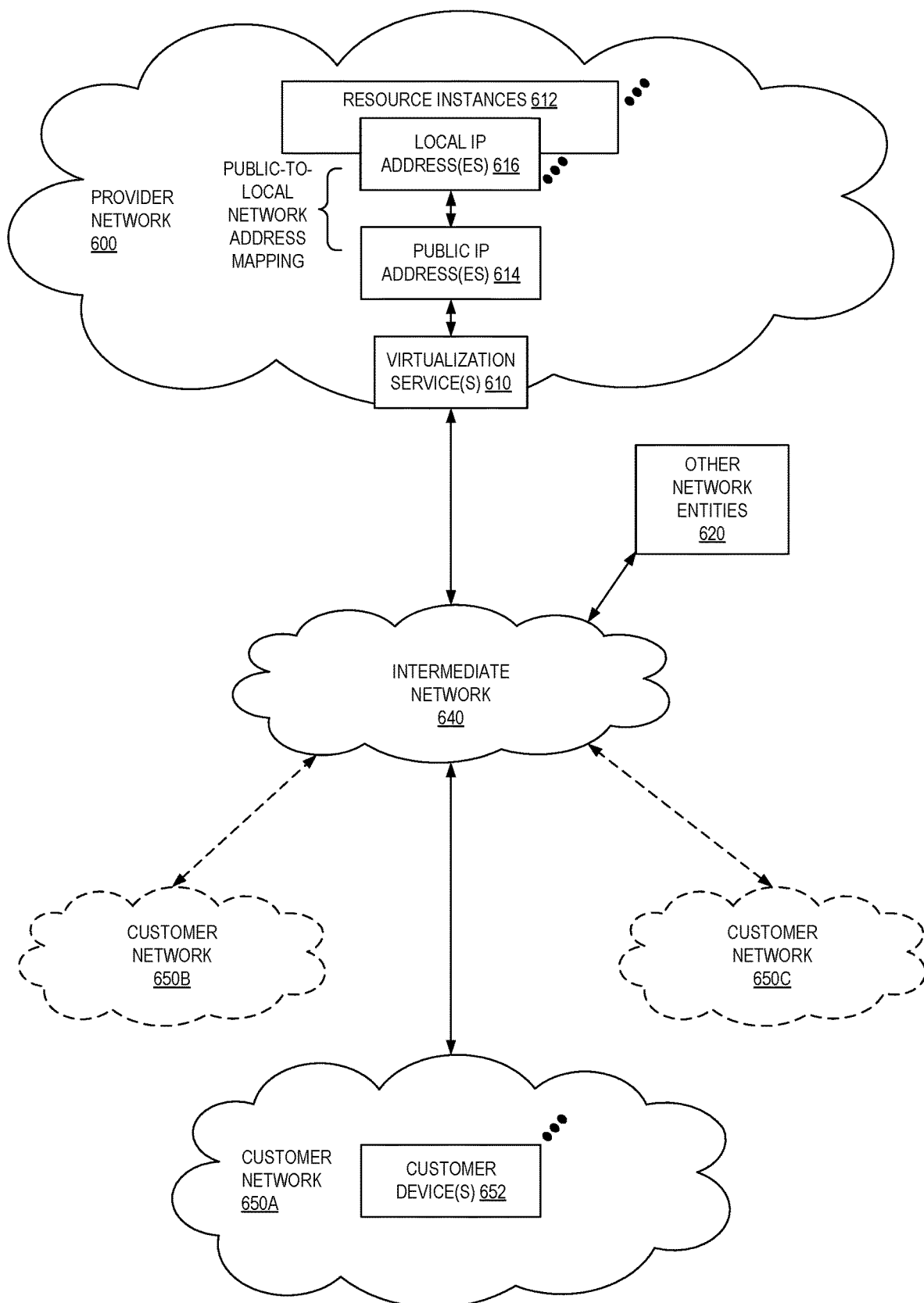
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
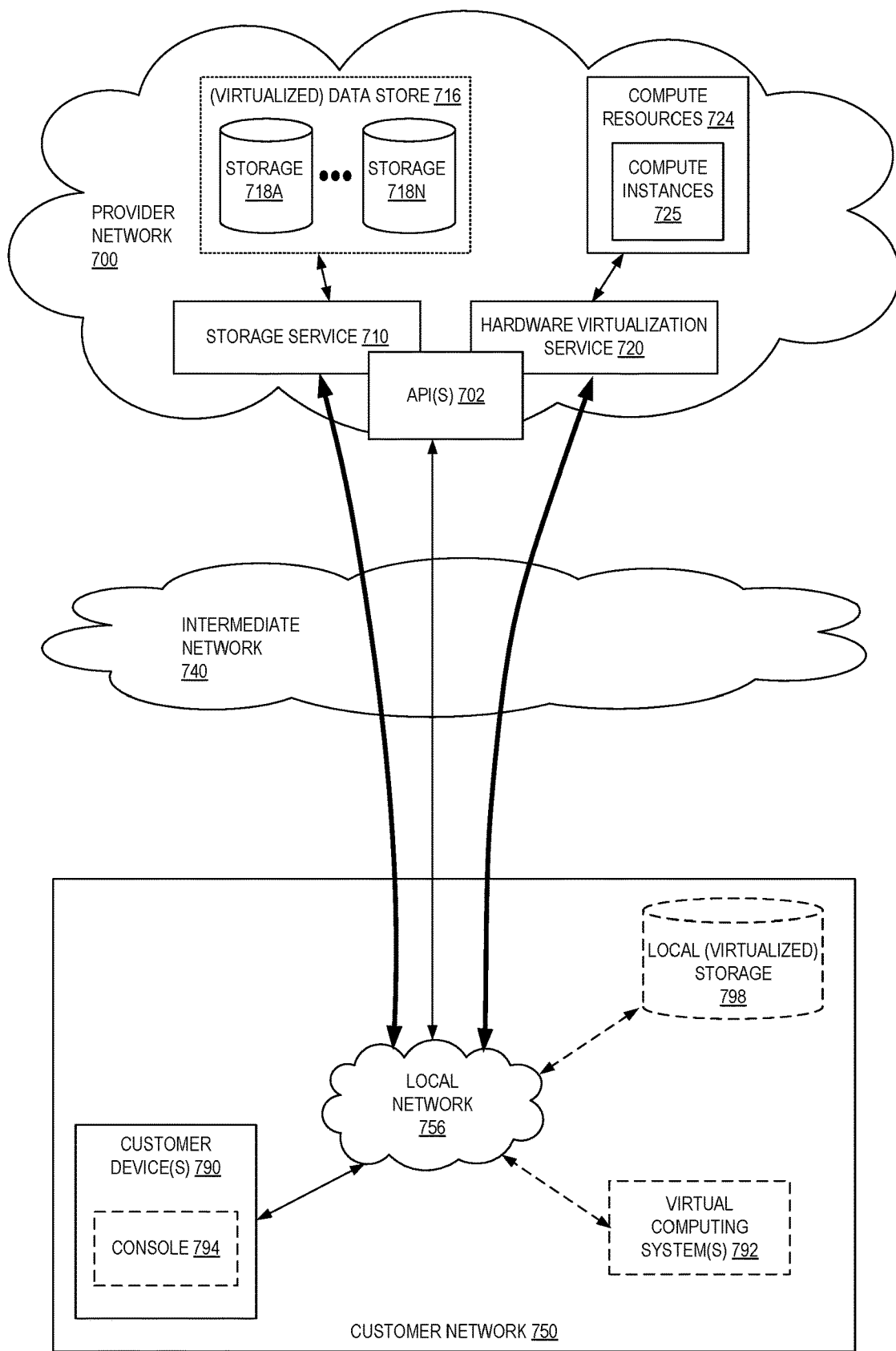
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
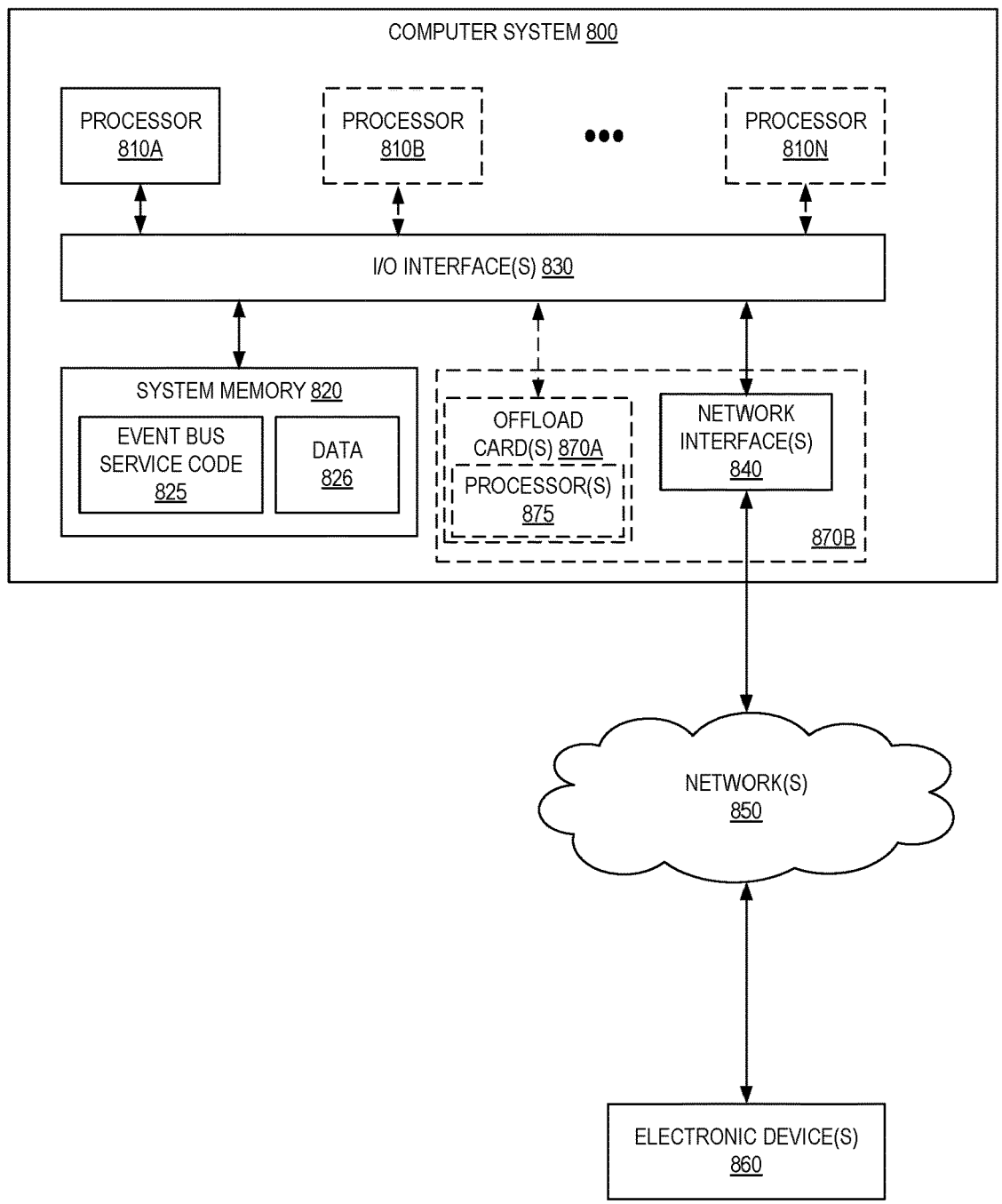
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as event bus service code 825 (e.g., executable to implement, in whole or in part, the event bus service 106) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    obtaining, by an event bus service of a cloud provider network, a plurality of events, wherein an event includes a data object indicating a change associated with at least one of: an application, a service of the cloud provider network, or a service external to the cloud provider network;
    storing the plurality of events in an event bus;
    determining, based on one or more rules associated with the event bus, that a first portion of the plurality of events are to be sent to an event target, wherein the one or more rules specify an event pattern that matches events in the first portion of the plurality of events;
    sending the first portion of the plurality of events to the event target, wherein sending an event includes at least one of: sending a request based on data contained in the event to a service of the cloud provider network, sending a request to an application programming interface (API) endpoint based on data contained in the event, or sending the event to another event bus;
    monitoring whether events from the first portion of the plurality of events were successfully delivered to the event target to obtain event delivery data;
    calculating, based on the event delivery data, an estimated rate at which events from the first portion of the plurality of events are successfully received by the event target;
    determining that the estimated rate at which events from the first portion of the plurality of events are successfully received by the event target is below a threshold rate; and
    sending a second portion of the plurality of events to the event target at a throttled rate.

2. The computer-implemented method of claim 1, further comprising:
    calculating an updated estimated rate at which events from the second portion of the plurality of events are successfully received by the event target;
    determining that the updated estimated rate at which events from the second portion of the plurality of events are successfully received by the event target is at or above the threshold rate; and
    sending additional events to the event target at a non-throttled rate.

3. The computer-implemented method of claim 1, wherein the plurality of events is a first plurality of events, wherein events in the first plurality of events are associated with a first user account of the cloud provider network, and wherein the method further comprises:
    obtaining, by the event bus service, a second plurality of events associated with a second user account of the cloud provider network;
    determining, during a time at which the event bus service is sending events associated with the first user account at the throttled rate, to send an event associated with the second user account from the second plurality of events to the event target; and
    sending the event associated with the second user account to the event target at a non-throttled rate.

4. A computer-implemented method comprising:
    obtaining, by a service of a cloud provider network, a plurality of events;
    sending a first portion of the plurality of events to an event target;
    monitoring whether events from the first portion of the plurality of events were successfully delivered to the event target to obtain event delivery data;
    calculating, based on the event delivery data, an estimated rate at which events from the first portion of the plurality of events are successfully received by the event target;
    determining that the estimated rate at which events from the first portion of the plurality of events are successfully received by the event target is below a threshold rate; and
    sending a second portion of the plurality of events to the event target at a throttled rate.

5. The computer-implemented method of claim 4, further comprising:
    calculating an updated estimated rate at which events from the second portion of the plurality of events are successfully received by the event target;
    determining that the updated estimated rate at which events from the second portion of the plurality of events are successfully received by the event target is at or above the threshold rate; and
    sending additional events to the event target at a non-throttled rate.

6. The computer-implemented method of claim 4, wherein the plurality of events is a first plurality of events, wherein events in the first plurality of events are associated with a first user account of the cloud provider network, and wherein the method further comprises:
    obtaining, by the service, a second plurality of events associated with a second user account of the cloud provider network;
    determining, during a time at which the service is sending events associated with the first user account at the throttled rate, to send an event associated with the second user account from the second plurality of events to the event target; and
    sending the event associated with the second user account to the event target at a non-throttled rate.

7. The computer-implemented method of claim 4, further comprising:
    determining that events in the plurality of events are associated with a user account of the cloud provider network; and
    deprioritizing delivery of events associated with the user account relative to other user accounts.

8. The computer-implemented method of claim 4, wherein the event target is a service of the cloud provider network, and wherein the method further comprises determining, based on the estimated rate, to send events directed to the service of the cloud provider network at the throttled rate.

9. The computer-implemented method of claim 4, wherein the event target is a same computing resource provided by a service of the cloud provider network, and wherein the method further comprises determining, based on the estimated rate, to send events directed to the same computing resource at the throttled rate.

10. The computer-implemented method of claim 4, wherein the plurality of events is a first plurality of events, wherein the event target is a first event target, wherein the event delivery data is first event delivery data, and wherein the estimated rate is a first estimated rate, and wherein the method further comprises:
   determining that a first portion of a second plurality of events is to be sent to one or more second event targets;
   sending the first portion of the second plurality of events to the one or more second event targets, wherein the one or more second event targets are associated with a same attribute corresponding to at least one of: a virtual private network, an availability zone of the cloud provider network, a region of the cloud provider network, an organization of user accounts, a vendor, or an Internet Protocol (IP) range;
   calculating, based on the event delivery data, a second estimated rate for the one or more second event targets that are associated with the same attribute;
   determining that the second estimated rate is below a threshold rate; and
   sending a second portion of the second plurality of events to the one or more second event targets at a throttled rate.

11. The computer-implemented method of claim 4, wherein an event from the plurality of events includes a data object indicating a change associated with at least one of: an application, a service of the cloud provider network, or a service external to the cloud provider network; and
   wherein the data object includes a plurality of fields identifying at least one of: an identifier of the event, a type of the event, a source of the event, a user account associated with the event, a time the event occurred, a region of the cloud provider network, and an event detail field including information about the event.

12. The computer-implemented method of claim 4, wherein an event from the plurality of events includes an event detail field including information about the event, wherein the event detail field is generated by a source of the event, and wherein the estimated rate is generated for events from the first portion of the plurality of events including one or more defined values in the event detail field.

13. The computer-implemented method of claim 4, wherein the plurality of events is a first plurality of events, wherein the event target is a first event target, wherein an event from the first plurality of events includes an event field including information about the event, wherein the event field is generated by a source of the event, and wherein the estimated rate is generated for events from the first portion of the plurality of events including one or more user-specified values in the event field, and wherein the method further comprises:
   obtaining a second plurality of events;
   determining, based on one or more configured rules, that an event from the second plurality of events is to be sent to a second event target;
   identifying the one or more user-specified values in an event field of the event from the second plurality of events; and
   sending the event from the second plurality of events at the throttled rate.

14. The computer-implemented method of claim 4, wherein events in the plurality of events are sent by a computing resource of a fleet of computing resources responsible for sending events to event targets including the event target, and wherein computing resources of the fleet of computing resources each calculate a respective estimated rate at which events are successfully received by event targets.

15. A system comprising:
   one or more electronic devices to implement a service in a multi-tenant provider network, wherein the service includes instructions that upon execution cause the service to:
      obtain a plurality of events,
      send a first portion of the plurality of events to an event target,
      monitor whether events from the first portion of the plurality of events were successfully delivered to the event target to obtain event delivery data,
      calculate, based on the event delivery data, an estimated rate at which events from the first portion of the plurality of events are successfully received by the event target,
      determine that the estimated rate at which events from the first portion of the plurality of events are successfully received by the event target is below a threshold rate, and
      send a second portion of the plurality of events to the event target at a throttled rate.

16. The system of claim 15, wherein the service further includes instructions that upon execution cause the service to:
   calculate an updated estimated rate at which events from the second portion of the plurality of events are successfully received by the event target;
   determine that the updated estimated rate at which events from the second portion of the plurality of events are successfully received by the event target is at or above the threshold rate; and
   send additional events to the event target at a non-throttled rate.

17. The system of claim 15, wherein the plurality of events is a first plurality of events, wherein events in the first plurality of events are associated with a first user account of the multi-tenant provider network, and wherein the service further includes instructions that upon execution cause the service to:
   obtain, by the service, a second plurality of events associated with a second user account of the multi-tenant provider network;
   determine, during a time at which the service is sending events associated with the first user account at the throttled rate, to send an event associated with the second user account from the second plurality of events to the event target; and
   send the event associated with the second user account to the event target at a non-throttled rate.

18. The system of claim 15, wherein the service further includes instructions that upon execution cause the service to:
   determine that events in the plurality of events are associated with a user account of the multi-tenant provider network; and
   deprioritize delivery of events associated with the user account relative to other user accounts.

19. The system of claim 15, wherein the event target is a service of the multi-tenant provider network, and wherein the service further includes instructions that upon execution cause the service to determine, based on the estimated rate, to send events directed to the service of the multi-tenant provider network at the throttled rate.

20. The system of claim 15, wherein the event target is a same computing resource provided by a service of the multi-tenant provider network, and wherein the service further includes instructions that upon execution cause the service to determine, based on the estimated rate, to send events directed to the same computing resource at the throttled rate.

* * * * *